(12) United States Patent
Zhong et al.

(10) Patent No.: US 7,147,674 B1
(45) Date of Patent: Dec. 12, 2006

(54) PRETREATED POROUS ELECTRODE AND METHOD FOR MANUFACTURING SAME

(75) Inventors: Linda Zhong, San Diego, CA (US); Xiaomei Xi, Carlsbad, CA (US); Bin Zou, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

(21) Appl. No.: 11/087,409

(22) Filed: Mar. 23, 2005

(51) Int. Cl.
*H01G 9/00* (2006.01)
*H01L 21/20* (2006.01)

(52) U.S. Cl. .................. 29/25.03; 438/238; 438/381
(58) Field of Classification Search ............ 29/25.03; 438/238, 381
See application file for complete search history.

(56) References Cited

U.S. PATENT DOCUMENTS 6,127,474 A * 10/2000 Andelman ................. 524/495
6,296,746 B1 * 10/2001 Broman et al. .............. 204/294
6,359,769 B1 * 3/2002 Mushiake et al. .......... 361/502
6,500,770 B1 * 12/2002 Cheng et al. ............... 438/782

* cited by examiner

*Primary Examiner*—H. Jey Tsai
(74) *Attorney, Agent, or Firm*—Hensley Kim & Edgington LLC

(57) ABSTRACT

Active electrode material, such as fibrillized blend of activated carbon, polymer, and conductive carbon, is pretreated by immersion in a sealing coating. After the active electrode material is dried, the coating seals micropores of the activated carbon or another porous material, thus preventing exposure of water molecules or other impurities trapped in the micropores to outside agents. At the same time, the sealing coating does not seal most mesopores of the porous material, allowing exposure of the mesopores' surface area to the outside agents. The pretreated active electrode material is used for making electrodes or electrode assemblies of electrical energy storage devices. For example, the electrodes may be immersed in an electrolyte to construct electrochemical double layer capacitors. Pretreatment with the sealing coating reduces the number of water molecules interacting with the electrolyte, enhancing the breakdown voltage of the capacitors.

18 Claims, 5 Drawing Sheets

PRETREATED POROUS ELECTRODE AND METHOD FOR MANUFACTURING SAME

FIELD OF THE INVENTION

The present invention generally relates to processing of porous materials. More specifically, the present invention relates to porous electrodes and to energy storage devices, such as electrochemical double layer capacitors, fabricated using porous electrodes.

BACKGROUND

Electrodes are widely used in many devices that store electrical energy, including primary (non-rechargeable) battery cells, secondary (rechargeable) battery cells, fuel cells, and capacitors. Important characteristics of electrical energy storage devices include energy density, power density, maximum charging rate, internal leakage current, equivalent series resistance (ESR), and durability, i.e., the ability to withstand multiple charge-discharge cycles. For a number of reasons, double layer capacitors, also known as supercapacitors and ultracapacitors, are gaining popularity in many energy storage applications. The reasons include availability of double layer capacitors with high power densities (in both charge and discharge modes), and with energy densities approaching those of conventional rechargeable cells.

Double layer capacitors use electrodes immersed in an electrolyte (an electrolytic solution) as their energy storage element. Typically, a porous separator immersed in and impregnated with the electrolyte ensures that the electrodes do not come in contact with each other, preventing electronic current flow directly between the electrodes. At the same time, the porous separator allows ionic currents to flow between the electrodes in both directions. As discussed below, double layers of charges are formed at the interfaces between the solid electrodes and the electrolyte. Double layer capacitors owe their descriptive name to these layers.

When electric potential is applied between a pair of electrodes of a double layer capacitor, ions that exist within the electrolyte are attracted to the surfaces of the oppositely-charged electrodes, and migrate towards the electrodes. A layer of oppositely-charged ions is thus created and maintained near each electrode surface. Electrical energy is stored in the charge separation layers between these ionic layers and the charge layers of the corresponding electrode surfaces. In fact, the charge separation layers behave essentially as electrostatic capacitors. Electrostatic energy can also be stored in the double layer capacitors through orientation and alignment of molecules of the electrolytic solution under influence of the electric field induced by the potential.

In comparison to conventional capacitors, double layer capacitors have high capacitance in relation to their volume and weight. There are two main reasons for these volumetric and weight efficiencies. First, the charge separation layers are very narrow. Their widths are typically on the order of nanometers. Second, the electrodes can be made from a porous material, having very large effective surface area per unit volume. Because capacitance is directly proportional to the electrode area and inversely proportional to the widths of the charge separation layers, the combined effects of the large effective surface area and narrow charge separation layers result in capacitance that is very high in comparison to that of conventional capacitors of similar size and weight. High capacitance of double layer capacitors allows the capacitors to receive, store, and release large amounts of electrical energy.

Electrical energy storage capability of a capacitor is determined using a well-known formula, to wit:

$$E = \frac{C * V^2}{2}. \quad (1)$$

In this formula, E represents the stored energy, C stands for the capacitance, and V is the voltage of the charged capacitor. Thus, the maximum energy ($E_m$) that can be stored in a capacitor is given by the following expression:

$$E_m = \frac{C * V_r^2}{2}, \quad (2)$$

where $V_r$ stands for the rated voltage of the capacitor. It follows that a capacitor's energy storage capability depends on both (1) its capacitance, and (2) its rated voltage. Increasing these two parameters is therefore important to capacitor performance. Indeed, because the total energy storage capacity varies linearly with capacitance and as a second order of the voltage rating, increasing the voltage rating is the more important of the two objectives for improving capacitors.

Voltage ratings of double layer capacitors are generally limited by chemical reactions (reduction, oxidation) and breakdown that take place within the electrolytic solutions in presence of electric field induced between capacitor electrodes. Electrolytic solutions currently used in double layer capacitors are of two kinds. The first kind of electrolytic solutions includes organic solutions, such as propylene carbonate. Long lifetime prior art double layer capacitors made with organic electrolytes can boast voltage ratings approaching 2.5 volts.

Double layer capacitors may also be made with aqueous electrolytic solutions, for example, potassium hydroxide and sulfuric acid solutions. Double layer capacitor cells manufactured using aqueous electrolytes and activated carbon are typically rated at or below 1.2 volts in order to achieve a commercially acceptable number of charge-discharge cycles. Even small increases above 1.2 volts tend to reduce substantially the number of charge-discharge cycles that the capacitors can withstand without significant deterioration in performance.

The 2.5 volt rating is considerably below voltage rating theoretically achievable in organic electrolyte-based double layer capacitors. According to some calculations, double layer capacitors made with an organic electrolyte and activated carbon should perform reliably at voltages ranging to about 3.2–3.5 volts. Achieving this range, however, has been an elusive goal because of early decomposition and breakdown of the electrolyte. The problem results, at least in part, from presence of impurities within the activated carbon and within the electrolyte. Water is one of these impurities.

Trace amounts of water and other impurities can be found in most electrolytes, and they may affect capacitor reliability, durability, and voltage rating. Highly purified electrolytes, however, are commercially available at reasonable cost.

The active material of the electrode—activated carbon or another porous material, for example—almost invariably has some impurities, including water. Water may be present in the raw carbon, and it may be introduced or added during the electrode manufacturing process. In practice, purifying activated carbon has proven to be a much more difficult task than purifying electrolyte. Water molecules can attach to the carbon in several ways, including by means of VanderWaal's forces responsible for physical bonding, and chemical (covalent and hydrogen) bonding forces.

Whatever the nature of the bond between a water molecule and activated carbon, a high energy "excited site" is formed around it. Electrolyte interacts with the water molecules and decomposes more readily near such sites than elsewhere in the capacitor. The trapped water functions deleteriously at the capacitor's working potential, so that the maximum application voltage is affected by the water devolution voltage. This is believed to be a major contributing cause to the lower actual-versus-theoretical breakdown voltage of double layer capacitors.

It would be desirable to increase actual breakdown voltage of double layer capacitors. It would also be desirable to increase reliability and durability of double layer capacitors, as measured by the number of charge-discharge cycles that a capacitor can withstand without significant deterioration in its operating characteristics. Because capacitor breakdown voltage and durability are both compromised by interaction between electrolyte and water molecules trapped in the activated carbon, it would be desirable to reduce the interactions or eliminate the interactions altogether. More generally, it would be desirable to provide a method for preventing impurities attached to porous materials from interacting with surrounding gas or liquid in which the porous material is immersed.

SUMMARY

A need thus exists for methods for preventing or reducing exposure of high energy excited sites within porous materials to outside agents. Another need exists for porous materials with reduced exposure of water and other impurities trapped in the materials to outside agents. A further need exists for electrodes made from porous materials having reduced content of water molecules that can interact with surrounding gas or liquid in which the electrodes are immersed. Still another need exists for double layer capacitors and other electrical energy storage devices that employ electrodes made from these materials.

Various embodiments of the present invention are directed to methods, electrodes, electrode assemblies, and energy storage devices that satisfy one or more of these needs. An exemplary embodiment of the invention herein disclosed is a method for processing porous material. According to this method, the porous material is treated with a sealing coating capable of sealing impurities in micropores of the porous material. The porous material is then dried, so that the coating seals water molecules in the micropores. Treatment may involve, for example, immersing the porous material in the sealing coating, and then draining the sealing coating from the porous material before the material is dried. The coating may be such that it does not seal at least a majority of mesapores of the porous material as measured by surface area, while sealing at least a predetermined percentage of water molecules in the micropores of the material.

In other aspects of the invention, the porous material includes activated carbon in particulate form, fibril-forming binder, and conductive carbon. These ingredients may be blended, for example, dry-blended, and subjected to high-shear forces in order to fibrillize the material. The high-shear forces may be applied using non-lubricated techniques.

To make an electrode, the porous material processed as described above may be coated onto one or both sides of a current collector so that film or films of the material are formed on the current collector when the material is dried. To densify the films, the electrode may be calendered. The electrode may then be used in a double layer capacitor, for example, by providing a second electrode, interposing a porous separator between the two electrodes, and immersing the separator and the two electrodes in an electrolyte.

In another aspect, an electrode assembly is made by coating a porous separator with the porous material processed as described above, so that films of the material are formed on the separator. Current collectors may then be attached to the surfaces of the films that are not in contact with the separator. The resulting electrode assembly may be calendered to densify the films. A double layer capacitor is obtained when the assembly is immersed in an electrolyte.

In one embodiment, a method for processing porous material comprises steps of: providing a porous material, at least some of the porous material comprising micropores, at least some of the micropores having impurities disposed therein; treating the porous material with a sealing coating to seal the impurities in micropores of the porous material; and drying the porous material. The treating step may comprise immersing the porous material in the sealing coating, the method further comprising: draining the sealing coating from the porous material before the drying step. The sealing coating may be such that it does not seal at least majority of mesapores of the porous material as measured by surface area. The sealing coating may be capable of sealing water molecules in micropores of the porous material. The step of providing the porous material may comprise providing activated carbon. The step of providing the porous material may comprise: providing a fibril-forming binder; providing conductive carbon; blending the activated carbon, the fibril-forming binder, and the conductive carbon, thereby obtaining blended active electrode material; and applying high-shear forces to the blended active electrode material to fibrillize the blended active electrode material. The step of providing the porous material further may comprise: providing a fibril-forming binder; providing conductive carbon; dry-blending the activated carbon, the fibril-forming binder, and the conductive carbon, thereby obtaining blended active electrode material; and applying a non-lubricated high-shear force technique to the blended active electrode material to dry fibrillize the blended active electrode material. The method may comprise processing porous material, wherein the step of providing activated carbon comprises providing the activated carbon in particulate form; providing a current collector; and coating the current collector with the fibrillized active electrode material before the step of drying, thereby obtaining the electrode. The step of coating the current collector may comprise coating both sides of the current collector with the fibrillized active electrode material so that first and second films of active electrode material are formed on both sides of the current collector. The method may comprise calendering the current collector with the films after the step of drying. The method may comprise: making first and second electrodes by providing a porous separator; disposing the separator between the first and second electrodes so that active electrode material is interposed between the separator and respective current collector of the electrodes; and immersing the electrodes and the separator in an electrolyte. The method may comprise providing processed porous material wherein the step of providing activated carbon comprises providing the activated carbon in particulate form; providing a porous separator; and coating the porous separator with the porous material before the step of drying; whereby the electrode assembly is obtained. The step of coating the porous separator may comprise coating both sides of the porous separator with the active electrode material so that a first film of active electrode material is formed on a first side of the porous separator and a second film of active electrode material is formed on a second side of the porous separator. The method may comprise attaching a first current collector to the first film so that the first film is disposed between the first current collector and the porous separator; and attaching a second current collector to the second film so that the second film is disposed between the second current collector and the porous separator. The method may further comprise calendering the electrode assembly. The method may comprise comprising: making the electrode assembly of claim; and immersing the electrode assembly in an electrolyte. The method for providing film of active electrode material may comprise providing processed porous material and calendering the processed porous material to obtain the film of active electrode material. The method may comprise providing processed porous material and calendering the processed porous material to obtain a first film of active electrode material and a second film of active electrode material; providing a porous separator; providing a first current collector and a second current collector; attaching the first film to the porous separator and to the first current collector so that the first film is disposed between the porous separator and the first current collector; attaching the second film to the porous separator and to the second current collector so that the second film is disposed between the porous separator and the second current collector, and the porous separator is disposed between the first and second films; and immersing the porous separator and the first and second films in an electrolyte.

In one embodiment, an electrochemical double layer capacitor comprises: a first and a second electrode material, wherein the active electrode material comprises a porous material and a sealing coating that seals water molecules in micropores of at least some of the porous material; a porous separator disposed between the first electrode material and the second electrode material; a first current collector and a second current collector, wherein the first electrode material is disposed between the porous separator and the first current collector, and the second electrode material is disposed between the porous separator and the second current collector; and an electrolyte, wherein the first electrode material, the second film electrode material and the porous separator are immersed in the electrolyte. The porous material may comprise activated carbon. The porous material may comprise dry fibrillized carbon particles and fibril-forming binder particles.

In one embodiment, an electrochemical double layer capacitor comprises: a first and a second fibrillized electrode material, wherein the fibrillized electrode material comprises a porous activated carbon and a sealing coating that seals water molecules in micropores of at least some of the activated carbon; a porous separator disposed between the first electrode material and the second electrode material; a first current collector and a second current collector, wherein the first electrode material is disposed between the porous separator and the first current collector, and the second electrode material is disposed between the porous separator and the second current collector; an electrolyte, wherein the first electrode material, the second film electrode material and the porous separator are immersed in the electrolyte; and a container, the container holding the electrolyte, the separator, and the first and second electrode material.

Active electrode material, such as fibrillized blend of activated carbon, polymer, and conductive carbon, can thus be pretreated by immersion in a sealing coating. After the active electrode material is dried, the coating seals micropores of the activated carbon or another porous material, thus preventing exposure of water molecules or other impurities trapped in the micropores to outside agents. At the same time, the sealing coating does not seal most mesopores of the porous material, allowing exposure of the mesopores' surface area to the outside agents. The pretreated active electrode material is used for making electrodes or electrode assemblies of electrical energy storage devices. For example, the electrodes may be immersed in an electrolyte to construct electrochemical double layer capacitors. Pretreatment with the sealing coating reduces the number of water molecules interacting with the electrolyte, enhancing the breakdown voltage of the capacitors.

These and other features and aspects of the present invention will be better understood with reference to the following description, drawings, and appended claims.

DETAILED DESCRIPTION

Figure 1:
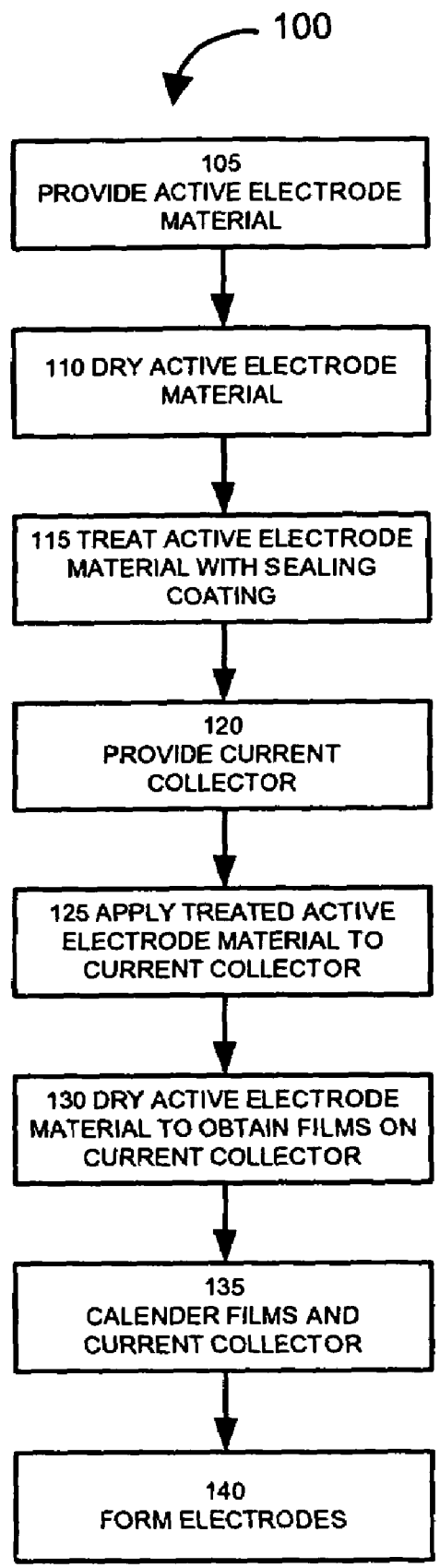
FIG. 1 illustrates selected steps of a process for making an electrode wherein active electrode material is pretreated with a sealing coating.

Reference will now be made in detail to several embodiments of the invention that are illustrated in the accompanying drawings. Same reference numerals may be used in the drawings and the description to refer to the same or like parts or steps. The drawings are in simplified form and not to precise scale. For purposes of convenience and clarity only, directional terms, such as top, bottom, left, right, up, down, over, above, below, beneath, rear, and front may be used with respect to the accompanying drawings. These and similar directional terms should not be construed to limit the scope of the invention in any manner.

The words "embodiment" and "variant" refer to particular apparatus or process, and not necessarily to the same apparatus or process. Thus, "one embodiment" (or a similar expression) used in one place or context can refer to a particular apparatus or process; the same or a similar expression in a different place can refer to a different apparatus or process. The expression "alternative embodiment" and similar phrases are used to indicate one of a number of different possible embodiments. The number of potential embodiments is not necessarily limited to two or any other quantity.

The expression "active electrode material" and similar phrases signify material that enhances the function of the electrode beyond simply providing a contact or reactive area approximately the size of the visible external surface of the electrode. In a double layer capacitor electrode, for example, a film of active electrode material includes particles with high porosity, so that the surface area of the electrode exposed to an electrolyte (in which the electrode is immersed) is increased well beyond the area of the visible external surface; in effect, the surface area exposed to the electrolyte becomes a function of the volume of the film made from the active electrode material. The meaning of the word "film" is similar to the meaning of the words "layer" and "sheet"; "film" does not necessarily imply a particular thickness of the material. The references to "fibrillizable binder" and "fibril-forming binder" within this document are intended to convey the meaning of polymers, co-polymers, and similar ultra-high molecular weight substances capable of fibrillation. Such substances are often employed as binder for promoting cohesion in loosely-assembled particulate materials, i.e., active filler materials that perform some useful function in a particular application. When used to describe processing of porous materials, the words "pretreat," "treat" and their inflectional morphemes refer to subjecting the porous material to contact with a sealing coating to seal impurities within micropores of the material. For example, the material may be immersed in the coating, mixed with the coating, sprayed with the coating, exposed to condensation of coating vapors, or otherwise brought in contact with the coating. Note that "treat" and "pretreat" have a different meaning when these words are used to describe processing of current collectors, as is explained in context. "Calender" and "nip" as used in this document mean a device adapted for pressing and compressing. Pressing may be, but is not necessarily, performed using rollers. When used as a verb, "calender" means processing in a press, which may, but need not, include rollers.

Other and further definitions and clarifications of definitions may be found throughout this document.

Referring more particularly to the drawings, FIG. 1 illustrates selected steps of a process 100 for fabricating an electrode of a double layer capacitor. Although the process steps are described serially, certain steps may also be performed in conjunction or in parallel, in a pipelined manner, or otherwise. There is no particular requirement that the steps be performed in the same order in which this description lists them, except where explicitly so indicated, otherwise made clear from the context, or inherently required. Not all illustrated steps are strictly necessary, while other optional steps may be added to the process 100. A high level overview of the process 100 is provided immediately below; more detailed explanations of the steps of the process 100 and variants of the steps are provided following the overview.

At step 105, fibrillized particles of active electrode material are provided. At step 110, the fibrillized particles are dried to evaporate water molecules that may be present within the active electrode material. At step 115, the particles are mixed with or immersed in a sealing coating. The sealing coating is capable of sealing water molecules (and possibly also other impurities) in micropores of the active electrode material. The coating may also perform as an adhesive promoting cohesion of the particles of the active electrode material and adhesion of the particles to a surface, for example, current collector or separator surface. In some embodiments, two coatings are used: one for sealing the micropores, the other for acting as an adhesive. The sealing coating is such that it does not seal at least a majority (as measured by surface area) of mesopores of the active electrode material. At step 120, a current collector is provided. At step 125, the treated active electrode material is mixed with one or more processing material or liquid as known to those skilled in the art to form a slurry like paste, which is then coated onto the current collector. As will be discussed below, the current collector can be coated on two sides. At step 130, the paste is dried, resulting in an electrode sheet that includes (1) the current collector, and (2) one or two active electrode material layers. At step 135, the electrode sheet is calendered to densify the active electrode material layers. At step 140, the calendered sheet is formed into one or more electrodes/electrode assemblies for use in double layer capacitors.

We now turn to a more detailed description of the individual steps of the process 100, beginning with the step 105 in which fibrillized active electrode material is provided.

According to one technique for obtaining the fibrillized active electrode material, particles of active electrode material are dry-blended or otherwise mixed together with a fibrillizable binder (e.g., a polymer) and a conduction promoter to form a dry powder material. Dry-blending may be carried out, for example, for 1 to 10 minutes in a V-blender equipped with a high intensity mixing bar, until a uniform dry mixture is formed. Those skilled in the art will identify, after perusal of this document, that blending time can vary based on batch size, materials, particle size, densities, as well as other properties, and yet remain within the scope of the present invention. The resulting dry powder material is dry fibrillized (fibrillated) using non-lubricated high-shear force techniques, such as jet milling, pin milling, hammer milling, or similar techniques known to a person skilled in the art. The shear forces that arise during the dry fibrillation process physically stretch the polymer particles, causing the polymer to form a network of fibers that bind the polymer to the conduction promoter and to the active electrode particles. The polymer acts as a matrix for holding the active electrode particles and the conduction promoter particles within the fibrillized material.

In some embodiments, the active electrode material and the conduction promoter used in this process are, respectively, activated carbon and conductive carbon or graphite. Suitable activated carbon materials are available from a variety of sources, including Nuchar® powders sold by Westvaco Corporation of Stamford, Conn.; and YP-17 activated carbon particles sold by Kuraray Chemical Co., LTD, Shin-hankyu Bldg. 9F Blvd. C-237, 1-12-39 Umeda, Kiata-ku, Osaka 530-8611, Japan.

The polymers used in electrode embodiments in accordance with the present invention include, without limitation, polytetraflouroethylene (PTFE or Teflon®), polypropylene, polyethylene, co-polymers, and various polymer blends.

The specific proportions of the activated carbon, conductive carbon, and polymer used in selected exemplary embodiments are as follows: 85–90 percent by weight of activated carbon, 5–8 percent by weight of PTFE, and 2–10 percent by weight of conductive carbon. Other exemplary embodiments contain 85–93 percent of activated carbon, 3–8 percent of PTFE, and 2–10 percent of conductive carbon. Yet other exemplary embodiments contain activated carbon and PTFE, and do not use conductive carbon.

It should be noted that the references to dry-blending, dry powders, other dry processes, and dry materials used in the manufacture of the active electrode material films do not exclude the use of electrolyte in the double layer capacitors. As has already been mentioned, the electrodes and the separator are typically immersed in and impregnated with an electrolytic solution in order to make a double layer capacitor. Furthermore, even though additives, such as solvents, liquids, and the like, are not necessarily used in the manufacture of certain embodiments disclosed herein, a certain amount of impurity, for example, moisture, may be absorbed by the active electrode material from the surrounding environment. Those skilled in the art will understand, after perusal of this document that the dry particles used with embodiments and processes disclosed herein may also, prior to being provided by particle manufacturers as dry particles, have themselves been preprocessed with additives and, thus, contain one or more pre-process residues. For these reasons, one or more of the embodiments and processes disclosed herein may utilize a drying step prior to a final electrolyte impregnation step so as to remove or reduce the aforementioned pre-process residues and impurities. It is identified that even after one or more drying steps, trace amounts of the aforementioned pre-process residues and impurities may be present in the active electrode material and the electrode film made from the material.

The drying step 110 may involve air-drying the fibrillized particles. Alternatively, the particles are force-dried at an elevated temperature. For example, the particles may be subjected to a temperature between about 100 and 150 degrees Celsius. It has been identified that subjecting the active electrode material to the elevated temperature substantially reduces the presence of water molecules held by physical bonding forces (VanderWaal's forces) in mesapores and macropores of the material. At the same time, water molecules held by the physical binding forces in micropores may remain trapped because of the small size of the micropores and capillary effects. Note that for the purposes of this document, we roughly divide the pores according to their dimensions (diameters or longest dimensions) along the following lines:

Micropores—under about 2 nanometers;
Mesapores—between about 2 and about 25 nanometers; and
Macropores—over about 25 nanometers.

It has been identified that drying has a less pronounced effect on the water molecules held by chemical bonding forces within the active electrode material than on water molecules held by physical bonding forces. The probable reason for the diminished effect is that chemical bonding forces are generally stronger than VanderWaal's forces.

In some embodiments, the drying step 110 is performed prior to fibrillizing the active electrode particles.

At the step 115, the fibrillized particles are mixed with a sealing coating. The coating is "sealing" in the sense that it penetrates the micropores of the active electrode material and surrounds the water molecules (and possibly other impurities) within the micropores. The water molecules become sealed within the micropores. In some embodiments, more than 30 percent of water molecules in the micropores are sealed. In more specific embodiments, at least 50 percent of water molecules in the micropores are sealed. In yet more specific embodiments, at least 80 percent of water molecules in the micropores are sealed. When the active electrode material is subsequently immersed in an electrolyte, the sealed water molecules are not able to interact with the electrolyte, or the effect of such interaction is diminished. Consequently, the number of high energy excited sites is reduced. The other desirable (but not strictly necessary) property of the coating is that it can act as an adhesive.

One sealing coating adapted for use in methods described throughout this document is known by the trade name Electrodag® EB-012. It is available from Acheson Colloids Company, 1600 Washington Avenue, Port Huron, Mich. 48060; telephone number (810) 984-5581; www.achesonindustries.com. The Electrodag® EB-012 is a water-based dispersion of graphite in a thermoplastic binder.

Other coatings adapted for use in the described methods can be selected from the Adcote® line of solvent-based adhesives, available from Rohm and Haas Company, 100 Independence Mall West, Philadelphia, Pa. 19106-2399; telephone number 215-592-3000; facsimile number 215-592-3377; www.rohmhaas.com.

In one embodiment, the active electrode material particles are first immersed in a sealing coating. The sealing coating is then drained through a filter, and the particles are dried, allowing the micropores to be sealed. After treatment with the sealing coating, the active electrode particles are mixed with an adhesive coating. The resulting material may then as be mixed with one or more processing material or liquid to obtain a slurry-like paste.

The current collector provided in the step 120 may be made of a sheet of conductive material, such as metal sheet, foil, screen, or mesh. In one electrode embodiment, the current collector is a sheet of aluminum foil approximately 40 microns thick. In alternative embodiments, the thickness of the foil is between about 20 and about 100 microns. In other, more specific embodiments, the thickness of the aluminum foil is between about 30 and about 50 microns. In still other alternative embodiments, the current collector is relatively thick and is better described as a plate.

Conductive materials other than aluminum can also be used in the current collector. These materials include, for example, silver, copper, gold, platinum, palladium, steel, and tantalum, as well as various alloys of these metals. Non-metal materials are also potential candidates for use in the current collector.

In some embodiments, the current collector may be pretreated to enhance its adhesion properties. Treatment of the current collector may include mechanical roughing, chemical pitting, and/or use of a surface activation treatment, such as corona discharge, active plasma, ultraviolet, laser, or high frequency treatment methods known to a person skilled in the art.

In the step 125, the paste made with the treated active electrode particles is applied uniformly to one or both sides of the current collector, so that one or two films of active electrode material are formed after the paste is dried in the following step. The advantage of applying the paste to both sides of the current collector is that the two films or layers of the active electrode material may be made at the same time, resulting in an electrode assembly that includes two electrodes sharing the current collector.

At the step 130, the paste applied to the current collector may be allowed to air-dry, or it may be force-dried at an elevated temperature. Drying at elevated temperature has the advantage of shortening the drying time and, therefore, shortening the overall time for manufacturing electrodes. After the paste is dried, film (or films) of active electrode material is (are) formed on the current collector.

At the step 135, the current collector and the film(s) are processed in a calender or another high-pressure nip. As a result of this step, the active electrode material of the films is compacted and densified under the pressure applied by the nip. Compaction in a nip generally does not significantly reduce porosity on a small scale level. Because compacting reduces the film's volume while keeping pore surface area relatively unchanged, the normalized effective surface area of the material is increased. The volumetric efficiency of the active electrode films is therefore also increased. Moreover, compacting tends to decrease the equivalent series resistance of the capacitors built with electrodes made from the resulting current collector-film product. Structural integrity of the films and the films' adhesion to the current collector may also be improved as a result of calendering.

At the step 140, the combination of the current collector and the one or two films is shaped for use as electrodes, for example, trimmed to predetermined dimensions.

Figure 2:
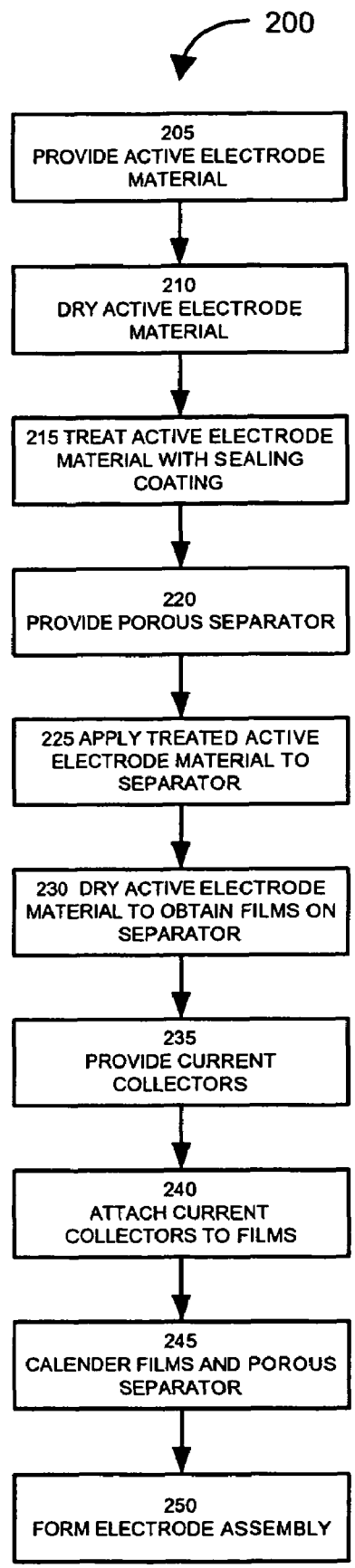
FIG. 2 illustrates selected steps of a process for making an electrode assembly wherein paste of pretreated electrode material particles is deposited on a separator of a double layer capacitor.

FIG. 2 illustrates selected steps of a process 200 for fabricating an electrode assembly wherein the paste of pretreated electrode material particles is deposited on a separator of a double layer capacitor. Although the process steps are described serially, certain steps may also be performed in conjunction or in parallel, in a pipelined manner, or otherwise. There is no particular requirement that the steps be performed in the same order in which this description lists them, except where explicitly so indicated, otherwise made clear from the context, or inherently required. Not all illustrated steps are strictly necessary, while other optional steps can be added to the process 200. A high level overview of the process 200 is provided immediately below; more detailed explanations of the steps of the process 200 and variants of the steps are provided following the overview.

At step 205, fibrillized particles of active electrode material are provided. At step 210, the fibrillized particles are dried to evaporate the water molecules within the active electrode material. At step 215, the particles are mixed with a sealing coating, after which a slurry-like paste composition is formed. The sealing coating is capable of sealing micropores in the active electrode material. The coating may also perform as an adhesive promoting cohesion of the particles of the active electrode material and adhesion of the particles to a surface, for example, current collector or separator surface. In some embodiments, two coatings are used: one for sealing micropores, the other for acting as an adhesive. At step 220, a porous separator sheet is provided. At step 225, the paste obtained in the step 215 is applied to both sides of the porous separator. Note that in alternative embodiments the paste is applied to only one side of the separator. At step 230, the paste is dried, resulting in electrode films being formed on the separator. At step 235, two current collectors are provided. At step 240, the current collectors are attached to the surfaces of the active electrode material films that are opposite the surfaces of the films adjacent to the separator sheet. At step 245, the combination of the separator sheet, active electrode material films, and current collectors is calendered. The resulting calendered product is formed into a shape appropriate for use in a double layer capacitor, at step 250.

The steps 205 through 215 of the process 200 are similar or identical to the steps 105 through 115 of the process 100 of FIG. 1.

The separator provided in the step 220 is made from a porous material that allows an electrolyte to pass through its pores or holes. At the same time, the separator material is capable of preventing direct electrical contact between the films of active electrode material disposed on each side of the separator. In various embodiments, the separator materials used include glass, polyethylene, polyphenylene sulfide, rayon, polypropylene, polyetheretherketone, other polymers, as well as compositions, laminates, and overlays of these materials. Furthermore, sheets formed using woven and unwoven fibers of these and other substances can also be used in making the separators. Separators of various embodiments further include cellulose, paper, and cotton linter. In one particular embodiment, the separator is made from TF3045 paper available from Nippon Kodoshi Corporation of Japan.

In the step 225, the paste made with the treated active electrode particles is applied uniformly to the sides of the separator, so that films of active electrode material are formed on the separator after the paste is dried in the following step.

At the step 230, the paste applied to the separator may be allowed to air-dry, or it may be force-dried at an elevated temperature. After the paste is dried, the films of active electrode material are formed on the separator.

Each of the current collectors provided in the step 235 may be similar or identical to the current collector provided in the step 120 of the process 100. For example, each current collector may be made of thin aluminum foil.

Turning next to the step 240, the current collectors may be attached to the active electrode films using an adhesive. In certain alternative process embodiments, the current collectors are deposited on the films using high-energy metallization techniques, such as flame spraying, arc spraying, plasma spraying, and high velocity oxygen fuel (HVOF) thermal spraying. In other embodiments, the current collectors are applied onto the films by vapor deposition, for example, low-pressure or sub-atmospheric chemical vapor deposition (LPCVD or SACVD). In still other embodiments, the current collectors are simply brought into contact with the films before calendering performed in the step 245, which laminates the current collectors to their respective films under high pressure, in addition to densifying the active electrode films. The step 245 is similar to the step 135 of the process 100.

At the step 250, the combination of the porous separator, films, and current collectors is shaped for use as electrodes, for example, trimmed to predetermined dimensions.

Figure 3:
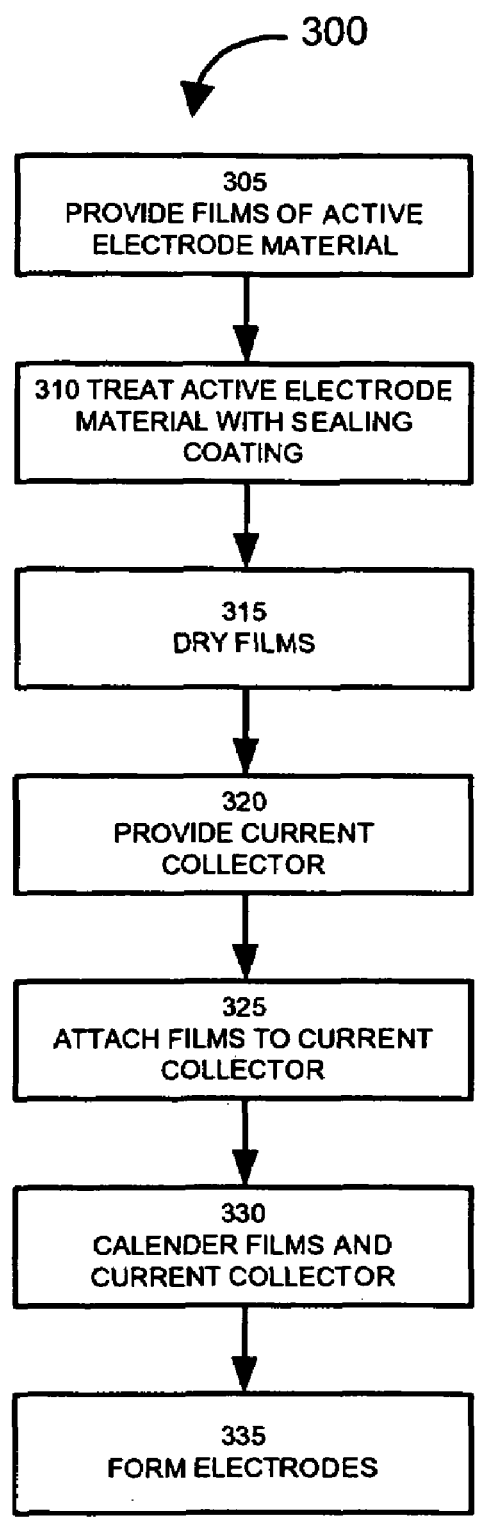
FIG. 3 illustrates selected steps of another process for making an electrode with pretreated active electrode material.

Films of active electrode material pretreated with a sealing coating may be made before they are attached to the current collectors (as in the process 100) or to the porous separator (as in the process 200). FIG. 3 illustrates selected steps of one such process 300. Although the process steps are described serially, certain steps may also be performed in conjunction or in parallel, in a pipelined manner, or otherwise. There is no particular requirement that the steps be performed in the same order in which this description lists them, except where explicitly so indicated, otherwise made clear from the context, or inherently required. Not all illustrated steps are strictly necessary, while other optional steps can be added to the process 300.

At step 305, two films of active electrode material are provided. In some process embodiments, polymer powder, active electrode material powder (e.g., activated carbon), conduction promoter powder (e.g., conductive carbon or graphite), and possibly other powder materials are blended, for example, using a dry-blending process. The proportions of the materials, the specific materials used, and the blending operation may be similar or identical to those described in relation to the process 100 of FIG. 1.

The dry powder material (that results from mixing and blending) is fibrillized (fibrillated) using non-lubricated high-shear techniques, such as jet milling, pin milling, hammer milling, or similar techniques known to a person skilled in the art. The fibrillized material is then fed into one or more high-pressure nips, such as roll mills, calenders, belt-presses, or flat plate presses, to press the material into films.

After the active electrode films are made, they are immersed in a sealing coating, for example, the Electrodag® EB-012 or Adcote® coating, at step 310. At step 315, the films treated with the sealing coating are dried, for example, air-dried or force dried at an elevated temperature. At step 320, a current collector is provided. This step is similar to the step 120 of the process 100. The active electrode films are attached to the current collector in step 325. Attachment may be performed using a number of different techniques, including these:

1. Using an adhesive layer between each film and the current collector, optionally followed by calendering.

2. Using high-energy metallization techniques, such as flame spraying, arc spraying, plasma spraying, and HVOF thermal spraying.

3. Using vapor deposition, for example, LPCVD and SACVD techniques.

At step 330, the current collector and the films are processed in a calender or another high-pressure nip. At step 335, the combination of the current collector and the one or two films is shaped for use as electrodes, for example, trimmed to predetermined dimensions.

Figure 4:
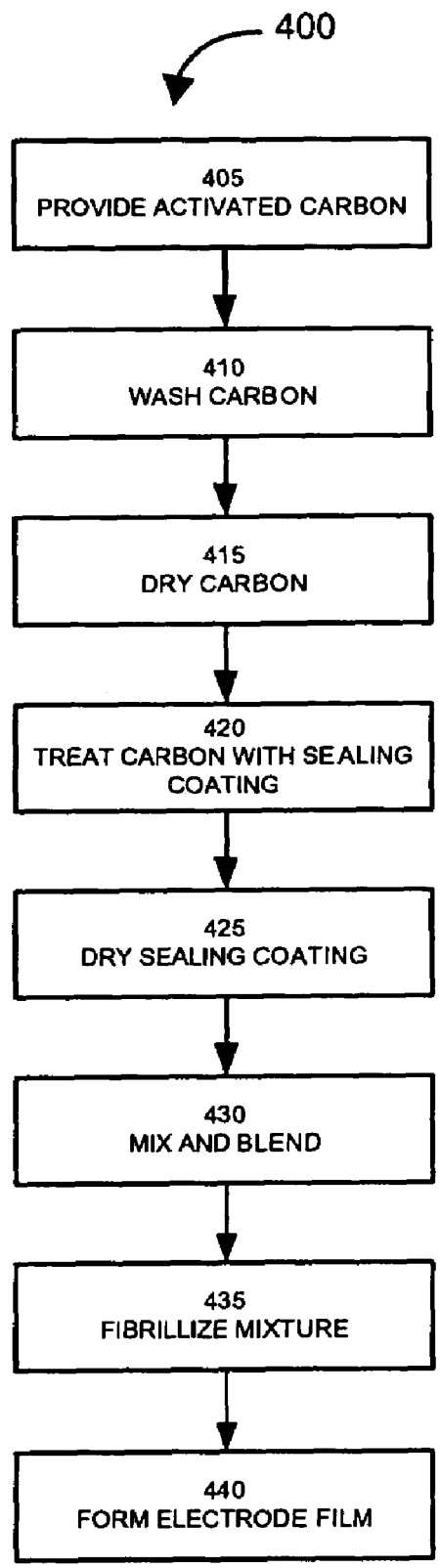
FIG. 4 illustrates selected steps of a process for making an electrode film with pretreated active electrode material.

Treatment of porous material with a sealing coating may be performed before the material is fibrillized. FIG. 4 illustrates selected steps of a process 400 for making film of fibrillized active electrode material wherein the porous material is treated with a sealant before the material is fibrillized. Although the process steps are described serially, certain steps may also be performed in conjunction or in parallel, in a pipelined manner, or otherwise. There is no particular requirement that the steps be performed in the same order in which this description lists them, except where explicitly so indicated, otherwise made clear from the context, or inherently required. Not all illustrated steps are strictly necessary, while other optional steps can be added to the process 400.

At step 405, activated carbon is provided. For example, carbon particles may be activated using thermal or chemical activation techniques that increase carbon porosity. At step 410, the activated carbon particles are washed to remove solid impurities.

At step 415, the carbon particles are force-dried at elevated temperature, or simply allowed to dry at room temperature. The step 415 may be similar to the step 110 of the process 100 described above.

At step 420, the carbon particles are treated with a sealing coating. This step is similar to the step 115 of the process 100. As has been described in relation to the process 100, the coating is "sealing" in the sense that it penetrates the micropores of the active electrode material and surrounds the water molecules (and possibly other impurities) within the micropores. The water molecules become sealed within the micropores. At step 425, the sealing coating with which the carbon particles have been treated is dried, for example, force-dried or allowed to dry at ambient temperature.

At step 430, the activated carbon particles are mixed with fibrillizable binder and, optionally, with particles of a conduction promoting material, such as conductive carbon. The mixture is then blended. After blending, the resulting dry powder material is fibrillized using, for example, non-lubricated high-shear force techniques, such as jet milling, pin milling, hammer milling, or similar techniques known to a person skilled in the art. This is done at step 435. Mixing, blending, fibrillation, and specific materials and proportions used in the steps 430 and 435 may be similar or identical to those that have been described in relation to the step 105 of the process 100.

At step 440, film or films are formed from the fibrillized material. In some exemplary embodiments, the fibrillized material is fed into one or more high-pressure nips, such as roll mills, calenders, belt-presses, or flat plate presses, to press the material into films. In other exemplary embodiments, particles of the fibrillized material are mixed with an adhesive to form a slurry-like paste composition, which may be deposited on a current collector or porous separator, and allowed to dry, as has been described in relation to step 125/130 and 225/230 of the processes 100 and 200, respectively. In yet other embodiments, treatment with sealant as described herein is performed on particles that are used form extruded type electrode films, as are known to those skilled in the extruded electrode arts.

Figure 5:
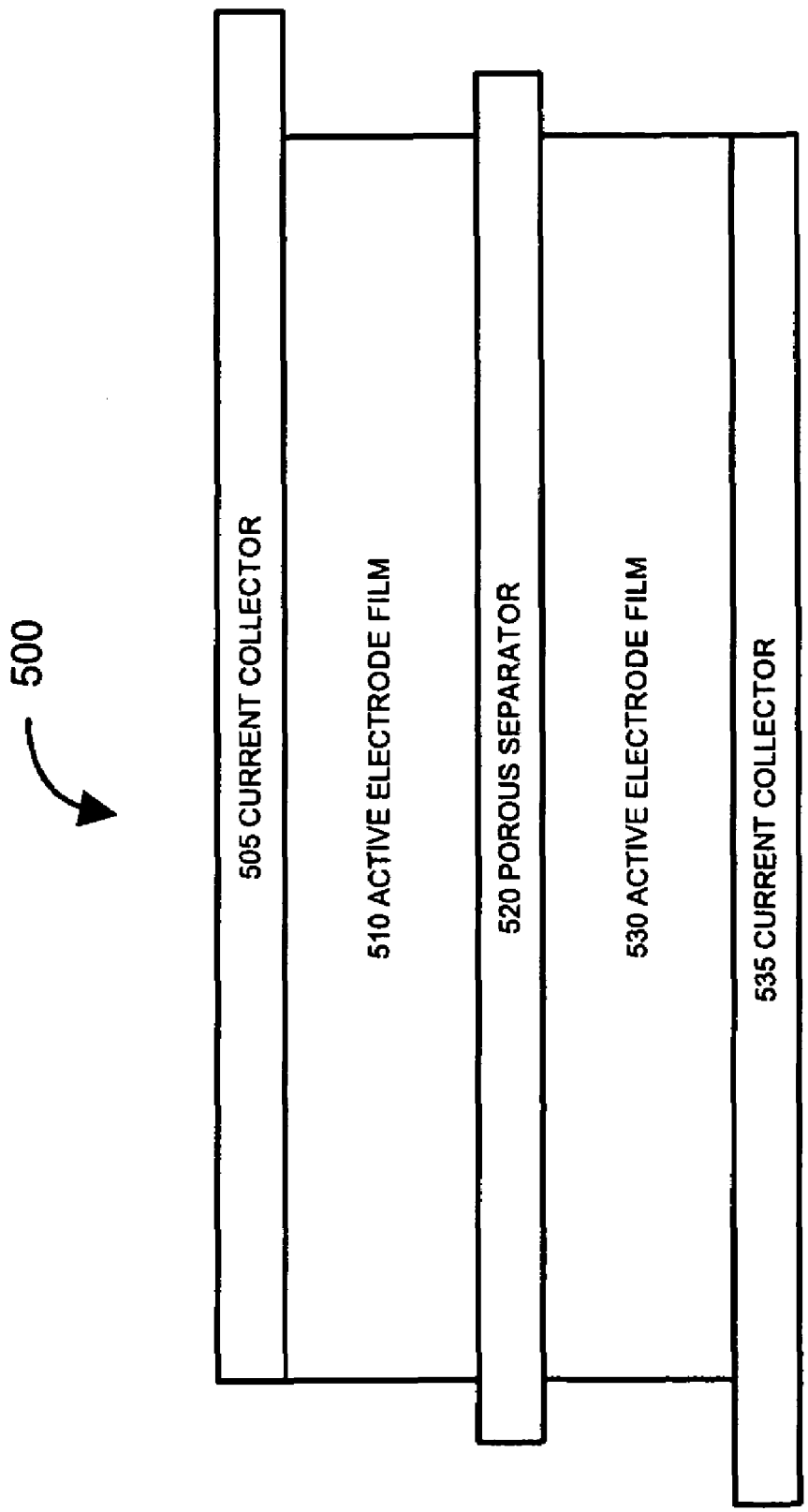
FIG. 5 illustrates, in a high-level manner, cross-section of an electrode assembly of a double layer capacitor.

The electrodes, electrode assemblies, and electrode films obtained through the processes 100, 200, 300, and 400 may be used in double layer capacitors and other electrical energy storage devices. FIG. 5 illustrates, in a high level manner, cross-section of an electrode assembly 500 of a double layer capacitor. In the Figure, the components of the assembly 500 are arranged in the following order: (1) first current collector layer 505, (2) first active electrode film 510, (3) porous separator 520, (4) second active electrode film 530, and (5) second current collector 535. A double layer capacitor using the electrode assembly 500 further includes an electrolyte and a container, for example, a sealed can, that holds the electrolyte. The assembly 500 is disposed within the container (can) and immersed in the electrolyte.

To understand better various steps of the processes 100, 200, 300, and 400, a person skilled in the art may also benefit from reading U.S. patent application Ser. No. 10/817,701, filed 2 April, 2004 and one or more provisional referenced therein. These commonly assigned patent documents are hereby incorporated by reference as if fully set forth herein, including all figures, tables, claims, and additional subject matter incorporated by reference therein.

Additional details for manufacturing double layer capacitors are described in various sources, including Farahmandi et al., U.S. Pat. No. 6,585,152, entitled METHOD OF MAKING A MULTI-ELECTRODE DOUBLE LAYER CAPACITOR HAVING SINGLE ELECTROLYTE SEAL AND ALUMINUM-IMPREGNATED CARBON CLOTH ELECTRODES; and in Bendale et al., U.S. Pat. No. 6,631,074, entitled ELECTROCHEMICAL DOUBLE LAYER CAPACITOR HAVING CARBON POWDER ELECTRODES. These commonly-assigned patents are hereby incorporated by reference as if fully set forth herein, including all figures, tables, claims, and additional subject matter incorporated by reference therein.

The inventive active electrode films, electrodes, electrode assemblies, energy storage devices, and processes used in the course of their fabrication are described above in considerable detail for illustration purposes. Neither the specific embodiments of the invention as a whole, nor those of its features, limit the general principles underlying the invention. In particular, the invention is not limited to the specific materials and proportions of constituent materials used for fabricating the electrodes. The invention is also not limited to electrodes used in double layer capacitors, but extends to other electrode applications. The specific features described herein may be used in some embodiments, but not in others, without departure from the spirit and scope of the invention as set forth. Many additional modifications are intended in the foregoing disclosure, and it will be appreciated by those of ordinary skill in the art that, in some instances, some features of the invention will be employed in the absence of a corresponding use of other features. The illustrative examples therefore do not define the metes and bounds of the invention and the legal protection afforded the invention, which function is served by the claims and their equivalents.

We claim:

1. A method for processing porous material, the method comprising:
creating a porous material for use in an electrode, wherein the porous material comprises a plurality of mesapores and a plurality of micropores interspersed among the plurality of mesapores, the plurality of the micropores having impurities disposed therein and the plurality of mesapores not being sealed and capable of receiving an electrolyte, wherein the creating operation comprises;
treating the porous material with a sealing coating to seal the impurities in micropores of the porous material; and
drying the porous material.

2. A method in accordance with claim 1, wherein the treating step comprises immersing the porous material in the sealing coating, the method further comprising:
draining the sealing coating from the porous material before the drying step.

3. A method in accordance with claim 1, wherein the sealing coating is such that it does not seal at least a majority of mesapores of the porous material as measured by surface area.

4. A method in accordance with claim 1, wherein the sealing coating is capable of sealing water molecules in micropores of the porous material.

5. A method in accordance with claim 4, wherein the step of providing the porous material comprises providing activated carbon.

6. A method in accordance with claim 5, wherein the step of providing the porous material further comprises:
providing a fibril-forming binder;
providing conductive carbon;
blending the activated carbon, the fibril-forming binder, and the conductive carbon, thereby obtaining blended active electrode material; and
applying high-shear forces to the blended active electrode material to fibrillize the blended active electrode material.

7. A method in accordance with claim 5, wherein the step of providing the porous material further comprises:
providing a fibril-forming binder;
providing conductive carbon;
dry-blending the activated carbon, the fibril-forming binder, and the conductive carbon, thereby obtaining blended active electrode material; and
applying a non-lubricated high-shear force technique to the blended active electrode material to dry fibrillize the blended active electrode material.

8. A method for making an electrode, the method comprising:
processing porous material in accordance with claim 6, wherein the step of providing activated carbon comprises providing the activated carbon in particulate form;
providing a current collector; and
coating the current collector with the fibrillized active electrode material before the step drying, thereby obtaining the electrode.

9. A method in accordance with claim 8, wherein:
the step of coating the current collector comprises coating both sides of the current collector with the fibrillized active electrode material so that first and second films of active electrode material are formed on both sides of the current collector.

10. A method in accordance with claim 9, further comprising:
calendering the current collector with the films after the step of drying.

11. A method for making a capacitor, the method comprising:
making first and second electrodes according to claim 8;
providing a porous separator;
disposing the separator between the first and second electrodes so that active electrode material is interposed between the separator and respective current collector of the electrodes; and
immersing the electrodes and the separator in an electrolyte.

12. A method for making an electrode assembly, the method comprising:
providing processed porous material in accordance with claim 6, wherein the step of providing activated carbon comprises providing the activated carbon in particulate form;
providing a porous separator; and
coating the porous separator with the porous material before the step of drying;
whereby the electrode assembly is obtained.

13. A method in accordance with claim 12, wherein:
the step of coating the porous separator comprises coating both sides of the porous separator with the active electrode material so that a first film of active electrode material is formed on a first side of the porous separator and a second film of active electrode material is formed on a second side of the porous separator.

14. A method in accordance with claim 13, further comprising:
attaching a first current collector to the first film so that the first film is disposed between the first current collector and the porous separator; and
attaching a second current collector to the second film so that the second film is disposed between the second current collector and the porous separator.

15. A method in accordance with claim 14, further comprising:
calendering the electrode assembly.

16. A method for making a capacitor, the method comprising:
making the electrode assembly of claim 15; and
immersing the electrode assembly in an electrolyte.

17. A method for a providing film of active electrode material, the method comprising:
providing processed porous material in accordance with claim 6;
calendering the processed porous material to obtain the film of active electrode material.

18. A method for making a capacitor, the method comprising:
providing processed porous material in accordance with claim 6;
calendering the processed porous material to obtain a first film of active electrode material and a second film of active electrode material;
providing a porous separator;
providing a first current collector and a second current collector;
attaching the first film to the porous separator and to the first current collector so that the first film is disposed between the porous separator and the first current collector;
attaching the second film to the porous separator and to the second current collector so that the second film is disposed between the porous separator and the second current collector, and the porous separator is disposed between the first and second films; and
immersing the porous separator and the first and second films in an electrolyte.

* * * * *